May 27, 1941. E. M. BURNS 2,243,241
ROTARY CULTIVATOR
Filed May 7, 1940
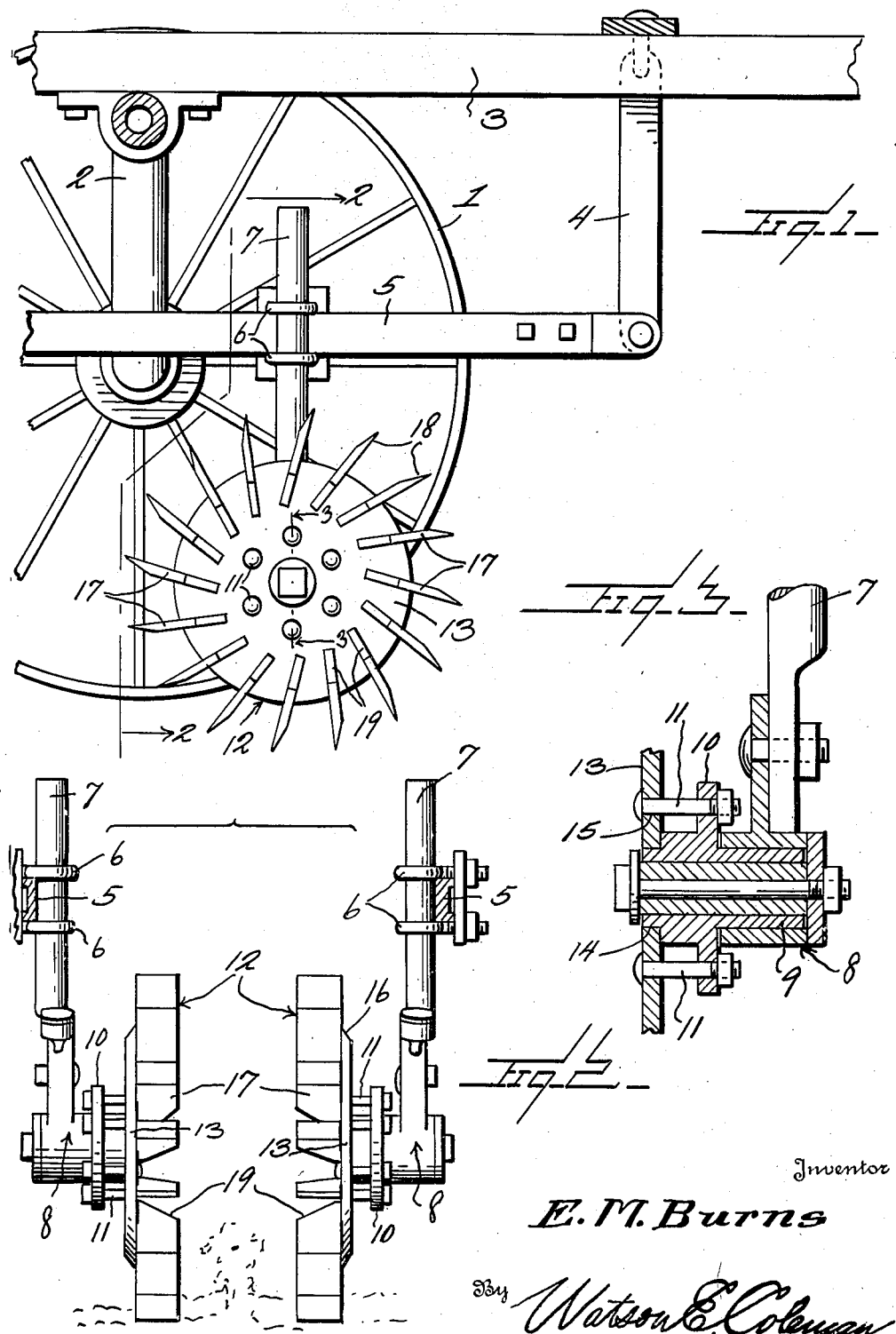
Inventor
E. M. Burns
By Watson E. Coleman
Attorney Patented May 27, 1941

2,243,241

UNITED STATES PATENT OFFICE 2,243,241

ROTARY CULTIVATOR

Edward M. Burns, Porterville, Calif., assignor of one-half to Frederick E. Stone, Porterville, Calif.

Application May 7, 1940, Serial No. 333,851

4 Claims. (Cl. 97—179)

This invention relates to the class of agricultural implements and pertains particularly to improvements in cultivators.

In the process of cultivating growing plants and particularly cotton plants, by the use of machine or wheeled cultivators, it is particularly difficult to break up the earth between the plants of a row. Where ordinary disk cultivators are employed with the disks arranged to pass along opposite sides of a row of plants the ground is broken up between the rows but remains unbroken between the individual plants of a row.

The primary object of the present invention is to provide a cultivator or mulcher which is so designed that when run along a row of plants, the two cooperating rotary units, because of their novel construction, will operate not only to break up the earth between the rows of plants but to break the earth in such a manner that the break will extend transversely of the row between the plants so that a better aeration of the roots of the plants will be obtained.

The invention more specifically comprises a rotatably mounted member comprising a disk body portion and a plurality of relatively broad plants or teeth, the widths of which extend axially of the disk, which blades are set to project from the periphery of the disk obliquely to a radial line whereby upon rotation of the disk the edges of the blades will be caused to enter the earth in such a manner as to have substantially a scooping action when rising from or leaving the earth. By this construction, when the disks or units are mounted in pairs to be run along opposite sides of a row of plants, the earth will be thoroughly broken up between the plants of the row as well as between the rows of plants.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Figure 1 illustrates a cultivator unit, in side elevation, constructed in accordance with the present invention and showing the manner of mounting such unit upon a wheeled structure.

Figure 2 illustrates a pair of such units mounted in spaced side by side relation for passage along opposite sides of a row of plants, the figure constituting a vertical section on the line 2—2 of Figure 1.

Figure 3 is a sectional view on the line 3—3 of Figure 1.

Referring now more particularly to the drawing, there is shown in Figure 1 a portion of a conventional cultivator machine in connection with which the cultivator disks or wheels embodying the present invention may be used. Of this machine there is shown one of the usual pair of wheels, which is indicated by the numeral 1, and which is connected with one end of a combined axle and frame 2 of inverted U-form to which is attached an end of a draft tongue 3.

Connected to the draft tongue by the usual links or hanger members 4 are rearwardly extending implement carrying arms 5, one only of which is shown in Figure 1 but a pair of which is illustrated in Figure 2. These arms 5 extend rearwardly in spaced parallel relation and have secured thereto by means of I-bolts 6 the disk or wheel supporting shanks 7. These shanks at their lower ends carry in the usual conventional manner the short rotary stub axle units, which are indicated as a whole by the numeral 8, the axle portion of each unit being indicated at 9 in Figure 3. This axle portion is provided with an encircling flange 10 through which securing bolts 11 pass.

The cultivator unit embodying the present invention is indicated as a whole by the numeral 12. This unit consists of a plate or a disk 13 having a central aperture at 14 to receive an end of the axle and a series of apertures 15 for the reception of the bolts 11 by which the disk is secured to the axle. The edge of the disk 13 is preferably beveled off, as indicated at 16, and upon the side of the disk opposite the bevel there are disposed a plurality of elongated relatively wide blades 17 which are secured on edge to the face of the disk and which extend a substantial distance beyond the periphery of the disk, as shown in Figure 1.

These blades are sharpened transversely at their outer ends to form the cutting edges 18 and they are arranged in such manner that each adjacent pair of blades is in convergent relation toward their inner ends and each blade extends from the disk in a direction oblique to the radius of the disk. In other words, each blade would extend oblique to a line extended from the center of the disk radially thereof and passing through a blade.

The disks when mounted upon their respective axles have the blades arranged so that upon forward movement of the machine with the edges of the blades in contact with or penetrating into the ground, will rotate so that the blades will start into the ground substantially in vertical position and as they penetrate more deeply and then begin to come up from the ground they will be tilted at an angle so as to lift the earth much in the same manner as a hand shovel. By this arrangement the earth will be broken and lifted and such a manner of breaking and lifting the surface will cause the earth to be broken across the row of plants and between the plants.

While the wheels may be adjusted to maintain a spaced parallel relation, as shown in Figure 2, it is also contemplated to arrange them so that they may toe in at the bottom to work closely to small plants or they may be toed or slanted in the opposite direction depending upon the size of the plants being cultivated.

It will be noted that the teeth are unconnected at their adjacent inner ends and, in addition, they are cut obliquely at their inner ends, as indicated at 19. This construction prevents earth from becoming packed in between the teeth and by cutting the inner ends of the teeth obliquely they will immediately drop or throw off any earth which may fall thereon so that earth and twigs cannot gather against the center of the disk between or within the circular area defined by the grouped inner ends of the blade. This angling or cutting obliquely of the inner ends of the blades gives to the unit substantially the same form as a disk harrow and, as previously stated, prevents earth from accumulating and packing in the central part of the unit.

I claim:

1. A cultivator unit comprising a disk mounted on a rotatably supported carrier so as to rotate concentrically with the carrier, and a plurality of elongated blades secured to a face of the disk and extending beyond the periphery thereof and each disposed at an angle to the radius of the disk, the blades being in spaced convergent relation at their inner ends, providing wide passageways for the escape of earth between said ends.

2. A cultivator unit comprising a disk body designed to be mounted at its center on a rotatably supported axle, a plurality of long relatively wide blades secured along a longitudinal edge to a face of the disk with a substantial portion of each blade extending beyond the periphery of the disk, said blades extending outwardly obliquely to the radius of the disk and said blades all having the same angular disposition on the disk, the disk being rotated by the axle in a direction to have the outer ends of the blades precede the inner ends thereof whereby such blades will enter the earth with a scooping action the blades being spaced apart at their adjacent inner ends.

3. A cultivator unit comprising a disk body designed to be mounted at its center on a rotatably supported axle, a plurality of long relatively wide blades secured along a longitudinal edge to a face of the disk with a substantial portion of each blade extending beyond the periphery of the disk, said blades extending outwardly obliquely to the radius of the disk and said blades all having the same angular disposition on the disk, the disk being rotated by the axle in a direction to have the outer ends of the blades precede the inner ends thereof whereby such blades will enter the earth with a scooping action, said blades having their inner ends spaced apart whereby earth may pass therebetween across the face of the disk and the blades at their inner ends being cut obliquely to form outwardly inclining edges.

4. An earth cultivating unit, comprising a disk, an axle secured at one end to the radial center of the disk upon one side thereof and extending axially therefrom for connection with a supporting bearing, a plurality of elongated flat blades secured on edge against the opposite face of the disk and extending beyond the periphery thereof, said blades being in convergent relation at their inner ends and spaced apart for the passage of dirt between such inner ends, the disposition of such axle solely upon one side of the disk facilitating the mounting of the unit with the blade supporting side thereof in relatively close proximity to the corresponding side of another similar unit.

EDWARD M. BURNS.